(12) United States Patent
Sagesaka et al.

(10) Patent No.: US 9,453,631 B2
(45) Date of Patent: Sep. 27, 2016

(54) WELDING STRUCTURE AND WELDING APPARATUS

(71) Applicant: KOITO MANUFACTURING CO., LTD., Tokyo (JP)

(72) Inventors: Yuji Sagesaka, Shizuoka (JP); Masakazu Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 117 days.

(21) Appl. No.: 14/522,978

(22) Filed: Oct. 24, 2014

(65) Prior Publication Data

US 2015/0124461 A1 May 7, 2015

(30) Foreign Application Priority Data

Nov. 1, 2013 (JP) ................................. 2013-227793

(51) Int. Cl.
| | | |
|---|---|---|
| *F21S 8/10* | (2006.01) | |
| *B29C 65/16* | (2006.01) | |
| *B29C 65/00* | (2006.01) | |
| *B29C 65/78* | (2006.01) | |
| *B29L 31/00* | (2006.01) | |
| *B29L 31/30* | (2006.01) | |

(52) U.S. Cl.
CPC ........ *F21S 48/2206* (2013.01); *B29C 65/1635* (2013.01); *B29C 65/1654* (2013.01); *B29C 65/1687* (2013.01); *B29C 66/112* (2013.01); *B29C 66/114* (2013.01); *B29C 66/301* (2013.01); *B29C 66/54* (2013.01); *B29C 66/73365* (2013.01); *B29C 66/81266* (2013.01); *B29C 66/81267* (2013.01); *F21S 48/1208* (2013.01); *F21S 48/1233* (2013.01); *B29C 65/1638* (2013.01); *B29C 65/7841* (2013.01); *B29K 2995/0027* (2013.01); *B29K 2995/0031* (2013.01); *B29L 2031/30* (2013.01); *B29L 2031/747* (2013.01)

(58) Field of Classification Search
CPC .......... B29C 65/1667; B29C 65/1635; B29C 66/118; B29C 66/1182; B29C 66/1222; F21S 48/2206
See application file for complete search history.

(56) References Cited

U.S. PATENT DOCUMENTS

| | | | | |
|---|---|---|---|---|
| 9,310,628 B2 * | 4/2016 | Barre | ...................... | G02C 7/085 |
| 2012/0155106 A1 * | 6/2012 | Kosugi | ............... | F21S 48/1208 |
| | | | | 362/546 |
| 2012/0241424 A1 * | 9/2012 | Sagesaka | ............ | B29C 65/1635 |
| | | | | 219/121.63 |

FOREIGN PATENT DOCUMENTS

JP         2006012502         1/2006

* cited by examiner

*Primary Examiner* — Karabi Guharay
(74) *Attorney, Agent, or Firm* — Abelman, Frayne & Schwab (57) ABSTRACT

Disclosed is a welding structure including a first member, and a light-transmissive second member. The second member includes a surface having an indented area. The first and second members are welded to each other at closely contacted surfaces thereof by projecting a spot light from the second member side in a state where the second member is in close contact with the first member. A curvature radius of the indented area existing on the surface of the second member, to which the spot light is projected, is at least two times a width of a welding portion.

4 Claims, 6 Drawing Sheets

WELDING STRUCTURE AND WELDING APPARATUS

CROSS-REFERENCE TO RELATED APPLICATIONS

This application is based on and claims priority from Japanese Patent Application No. 2013-227793 filed on Nov. 1, 2013 with the Japan Patent Office and the disclosure of which is incorporated herein in its entirety by reference.

TECHNICAL FIELD

The present disclosure relates to a welding structure in which a workpiece is welded by irradiation of light such as, for example, a laser beam, and a welding apparatus for implementing the welding structure.

BACKGROUND

One of processes of manufacturing a vehicular lamp is a process of integrally fixing a transparent front cover to a container-shaped lamp body. As for a technology for such fixation, a technology of welding the lamp body and the front cover is used. Specifically, the transparent front cover is positioned to be abutted on the lamp body and a laser beam is projected to abutted surfaces from the front cover side so that the front cover and the lamp body are molten and joined to each other at the abutted surfaces by the light energy of the laser beam. Another welding technology is also known in which in order to enhance the welding quality by the above-described welding method, the welding is performed in a state where the abutted surfaces are more closely contacted with each other by installing a plate-shaped transparent jig at the front cover side and pressing the front cover against the lamp body by the transparent jig.

However, when the laser welding is performed using the transparent jig, a spot diameter may be increased when the laser beam projected to the welding portion has passed through the transparent jig and the front cover. This may cause degradation of the welding quality. That is, the projected laser beam is refracted at a surface of the front cover or the transparent jig. Due to the refraction, the spot diameter of the laser beam is increased on welding surfaces. When the spot diameter increases, a light energy per unit area (hereinafter, referred to as a "light energy density") decreases, thereby degrading the welding quality. Japanese Patent Laid-Open Publication No. 2006-12502 proposes a technology that equalizes the sum of the thicknesses of the transparent jig and the front cover in order to prevent a variation of the spot diameter of the laser beam due to a variation of the sum of the thicknesses of the transparent jig and the front cover.

SUMMARY

Figure 6A:
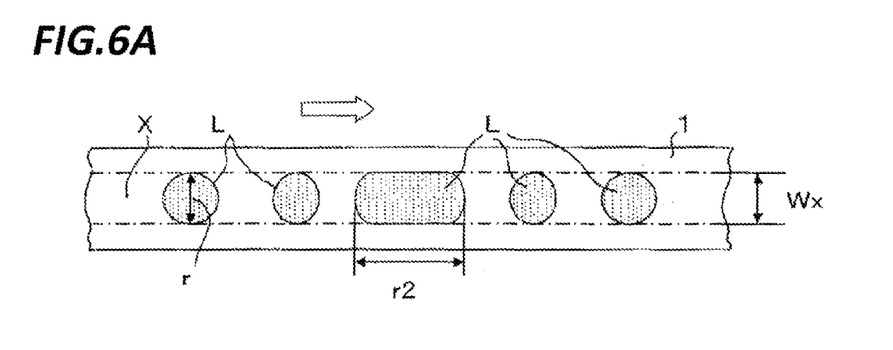
FIGS. 6A and 6B are a plan view and a vertical cross-sectional view which illustrate a spot diameter of a laser beam in an indented area having a small curvature radius.
Figure 6B:
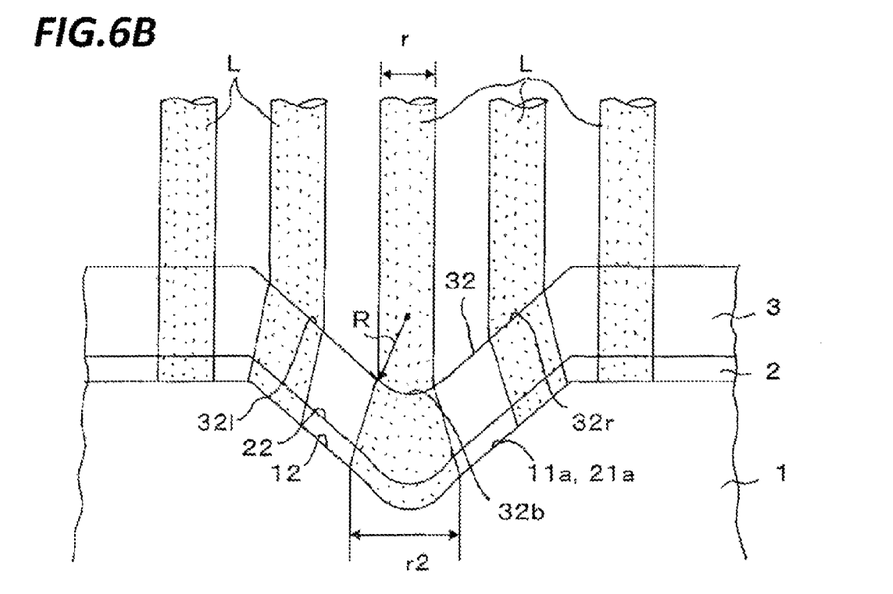

According to the technology disclosed in Japanese Patent Laid-Open Publication No. 2006-12502, the welding quality may be effectively improved since the spot diameter is maintained uniformly. However, through an analysis, the inventors found that it is difficult to uniformly maintain the spot diameter in a portion where a welding surface is recessed when viewed in a direction where a laser beam is projected. That is, as illustrated in FIGS. 6A and 6B, in a case where a small indented area 12 with a cross-section of a small curvature radius or an angular shape exists on a part of a welding surface 11a of a lamp body 1, when a laser welding is performed by projecting a laser beam L to a transparent jig 3 in a state in which a front cover 2 is disposed on the welding surface 11a and a transparent jig 3 is disposed on the front cover 2, the laser beam incident on the welding surface 11a from a surface of the transparent jig 3 is refracted to two opposite outward directions at an indented area 32 which is formed on a surface of the transparent jig 3 to correspond to the indented area 12 of the welding surface 11a. Thus, the spot diameter on the welding surface 11a is increased along the direction of the indented area 12. Therefore, the light energy density of the laser beam L is reduced on the welding surface 11a of the indented area 12, thereby degrading the welding quality. To prevent the increase of the spot diameter in the indented area 32 of the transparent jig 3, forming the surface of the transparent jig 3 as a flat surface may be considered. However, this increases the thickness of the transparent jig 3 in the indented area, which causes the variation of the spot diameter due to a difference in thickness including the transparent jig as described in Japan Patent Laid-Open Publication No. 2006-12502.

An object of the present disclosure is to provide a welding structure which is improved in welding quality of welding by, for example, a laser beam, and a welding apparatus.

A welding structure of the present disclosure includes a first member, and a light-transmissive second member including a surface having an indented area. The first and second members are welded to each other at closely contacted surfaces thereof by projecting a spot light from the second member side in a state where the second member is in close contact with the first member. A curvature radius of the indented area existing on the surface of the second member, to which the spot light is projected, is at least two times a width of a welding portion.

In the welding structure, for example, the first member is a lamp body of a lamp, and the second member is a light-transmitting cover. An opening rim of the lamp body and a peripheral edge of the translucent cover are welded to each other, and an indented area is formed in at least a part of the opening rim and the peripheral portion. The welding portion extends over a longitudinal direction of the opening rim and the peripheral portion, and the curvature radius of the indented area is at least two times a width which is orthogonal to the longitudinal direction of the welding portion.

The welding apparatus of the present disclosure includes a holding unit configured to hold a first member and a light-transmissive second member in a closely contacted state, and a light projecting unit configured to project a spot light from the second member side to closely contacted surfaces of the first and second members by causing the spot light emitted from a light source to pass through the holding unit. A curvature radius of an indented area existing on a surface of the holding unit on which the spot light is incident is at least two times a spot diameter of the spot light.

In the welding apparatus, the holding unit may include a light-transmissive transparent jig which is configured to press the second member against the first member, and the indented area of the transparent jig may have a curvature radius which is the same as the curvature radius of the indented area formed in the second member.

In the holding unit configured to hold the first member and the second member to be in closely contact with each other in the welding apparatus of the present disclosure, since the indented area formed on the surface on which the spot light for welding is incident has a curvature radius which is at least two times the spot diameter of the spot light, the spot diameter or the spot area of the spot light projected to the welding surface through the second member is not unnecessarily increased, and a reduction rate of light energy density may be maintained at a predetermined level, which enables a welding structure. In addition, since the welding apparatus may implement the welding structure of the present disclosure and form the welding parts on the welding structure of the present disclosure by a spot light having a low reduction rate of light energy density, a high welding quality can be obtained. Further, according to the welding structure of the present disclosure, the holding unit of the present disclosure can be formed in a uniform thickness. Thus, the reduction of light energy density due to a difference in thickness may be prevented.

The above-described summary is for the illustration purpose only and does not intend to limit in any ways. In addition to the illustrative embodiments, examples, and features described above, further embodiments, examples, and features will become apparent by referring to the drawings and the following detailed description.

DETAILED DESCRIPTION

In the following detailed descriptions, reference is made to the accompanying drawings which form a part of the present disclosure. The illustrative embodiments described in the detailed description, drawings, and claims do not intend to limit. Other embodiments may be utilized and other modified examples may be made without departing from the spirit or scope of the subject matter presented in the disclosure.

Figure 1:
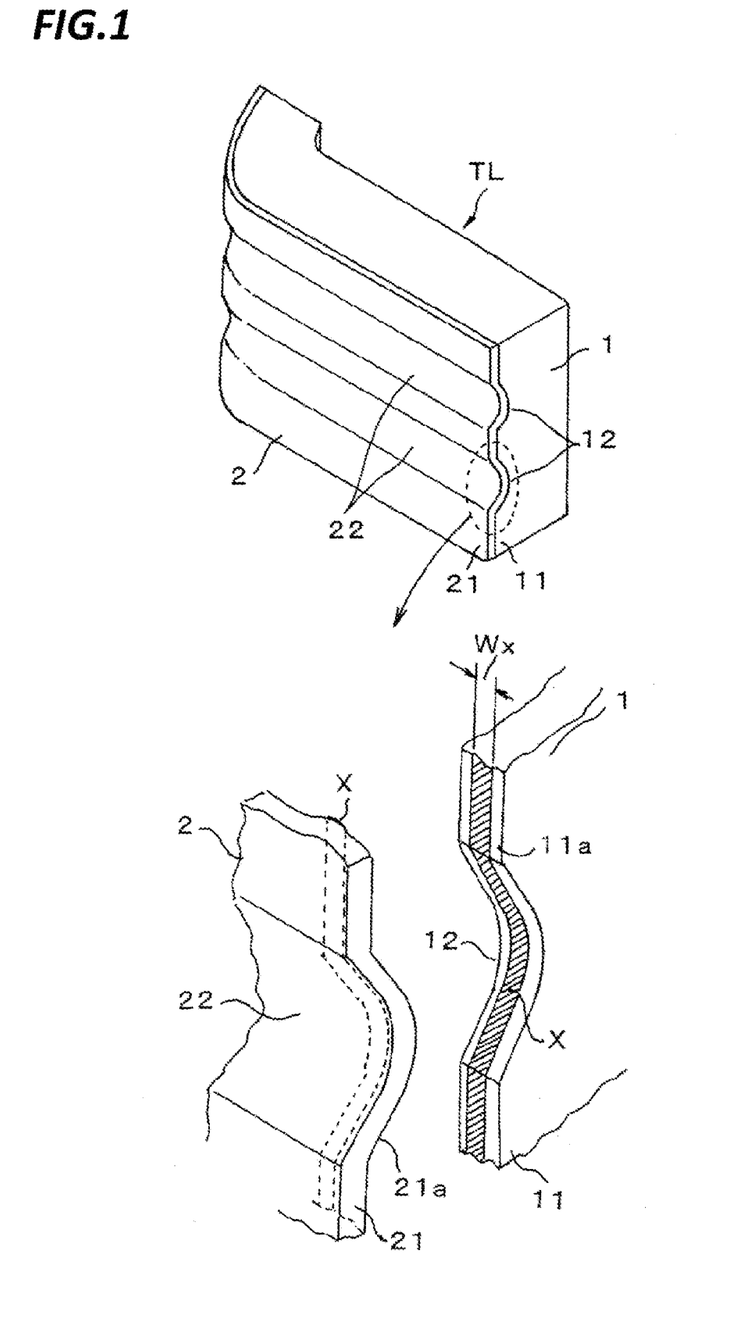
FIG. 1 illustrates a perspective view of an appearance of a vehicular tail lamp to which the present disclosure is applied and an exploded perspective view of a portion thereof.

Next, an exemplary embodiment of the present disclosure will be described with reference to the accompanying drawings. In the present embodiment, as illustrated in FIG. 1, an example of applying the present disclosure to a left tail lamp TL, in which indented areas required for a design purpose exist on a part of a front surface of the lamp, is illustrated as a welding structure of the present disclosure. FIG. 1 is a schematic perspective view illustrating an entire configuration of the tail lamp TL, in which an exploded perspective view of a part of the tail lamp TL is illustrated in a lower part of the FIG. 1. A lamp body 1 of the tail lamp TL is a first member in the present disclosure which is molded in a container-like shape using a light-absorbent resin, in which a front surface of an opening rim 11 thereof is configured as a welding surface 11a.

A front cover 2 of the tail lamp TL is a second member in the present disclosure which is molded using a light transmissive resin. The front cover 2 is formed in a plate shape with a substantially uniform thickness to have an appearance, of which a contour corresponds to the opening rim 11 of the lamp body 1. An inner surface of a peripheral edge 21 of the front cover 2 is a welding surface 21a which is in close contact with the front surface of the opening rim 11 of the lamp body 1, i.e. a welding surface 11a. The welding surface 21a is welded to the welding surface 11a of the opening rim 11 of the lamp body 1. A lamp housing of the tail lamp is configured by the lamp body 1 and the front cover 2, and a light source or an optical member is mounted in the lamp housing to form the tail lamp TL. Here, a description on a detailed configuration of the tail lamp is omitted.

Indented areas 12 are formed in a plurality of spots of the opening rim 11 in the lamp body 1, in which the indented areas 12 are recessed substantially in a "V" shape towards a bottom of the lamp body 1, from a requirement for a design of a vehicle body. Here, the indented areas 12 arranged in two tiers in a vertical direction are formed on left and right edges of the opening rim 11. Also, the front cover 2 is also formed with groove-shaped indented areas 22 on a portion corresponding to the indented areas 12 of the lamp body 1 when viewed from a surface, in which the indented areas 22 are arranged in two tiers in the vertical direction and extend in a horizontal direction. Further, on the welding surface 11a of the lamp body 1 and the welding surface 21a of the front cover 2 including the indented areas 12 and 22, welding portions X having a required width Wx are formed over the entire lengths along the circumferential direction of the welding surfaces 11a and 21a, and the lamp body 1 and the front cover 2 are welded to each other as described above through the welding portions X.

Figure 2A:
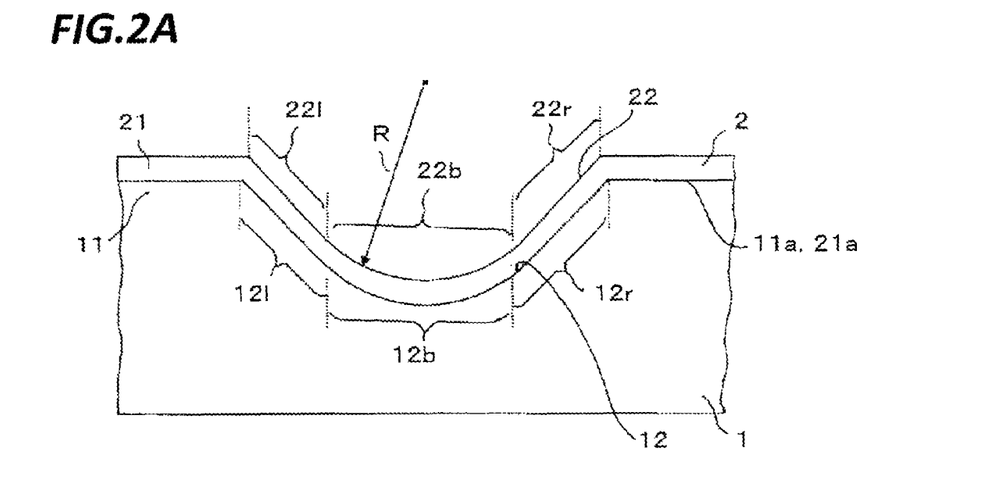
FIGS. 2A and 2B are enlarged views for describing an indented area of each of a lamp body, a front cover, and a transparent jig.

FIG. 2A is an enlarged view of the indented areas 12 and 22 in a state in which the opening rim 11 of the lamp body 1 faces upward. In the exemplary embodiment, since each indented area 12 of the opening rim 11 is formed substantially in a "V" shape in two-dimensional direction along the longitudinal direction as described above, inclined surfaces 12r and 12l (hereinafter, referred to as "slopes") at opposite sides of a bottom 12b of the indented area 12, which is most recessed interposed between the slopes 12r and 12l, are formed to extend in directions which intersect at an angle required for configuring the "V" shape. In addition, the surface of the bottom 12b interposed between the slopes 12r and 12l is formed as a curved surface having a curvature radius R which is at least two times the width Wx of the welding portions X.

Further, each indented area 22 formed in the front cover 2 is also formed with left and right slopes 22r and 22l and a bottom 22b, like the indented area 12 of the lamp body 1. Especially, the surface of the bottom 22b is formed as a curved surface having a curvature radius R which is the same as that of the indented area 12 of the lamp body 1, i.e. a curved surface having a curvature radius R which is at least two times the width Wx of the welding portions X. The reason for forming the curvature radius R of the bottoms 12b and 22b of the indented areas 12 and 22 of the lamp body 1 and the front cover 2 to be at least two times the width Wx of the welding portions X will be described later.

Figure 3:
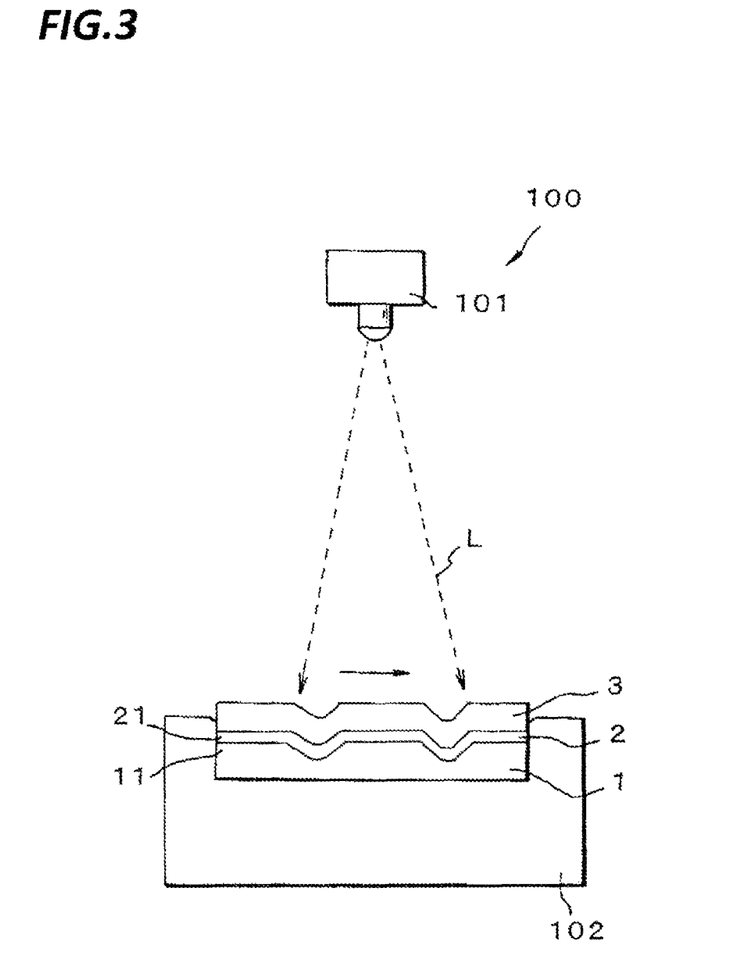
FIG. 3 is a conceptual view illustrating a configuration of a laser welding apparatus.

FIG. 3 is a conceptual view illustrating a configuration of a laser welding apparatus 100 which welds the front cover 2 to the lamp body 1. A laser projecting apparatus 101 is provided at a position above the laser welding apparatus 100. The laser projecting apparatus 101 is configured to project a laser beam emitted from a laser light source (not illustrated) as a laser beam L having a predetermined beam diameter, i.e. a laser beam having a predetermined spot diameter, through a light-condensing optical system, and to project the laser beam while scanning the laser beam towards an arbitrary direction through a deflection optical system (not illustrated). For example, a galvano mirror apparatus may be used as a deflection unit. Alternatively, the laser projecting apparatus may be configured to perform the scanning by controlling the entire laser projecting apparatus to be moved in an arbitrary direction.

A welding table 102 is installed in an area where the laser beam L is projected below the laser projecting apparatus 101, and the lamp body 1 is supported on the welding table 102 such that the opening rim 11 faces upward. The front cover 2 is disposed on the lamp body 1, and the peripheral edge 21 of the front cover 2 is superimposed on the opening rim 11 of the lamp body 1. At this time, of course, the welding surface 11a of the lamp body 1 and the welding surface 21a of the front cover 2 are superimposed to be in close contact with each other. In addition, a transparent jig 3 is disposed on the front cover 2 and pressed to be abutted on the front cover 2 by a support mechanism (not illustrated). Accordingly, the welding surface of the lamp body 1 and the welding surface of the front cover 2 are abutted to be in close contact with each other. The transparent jig 3 is configured as a holding unit to hold the first member and the second member which is light-transmissive, in a closely contacted state.

Figure 2B:
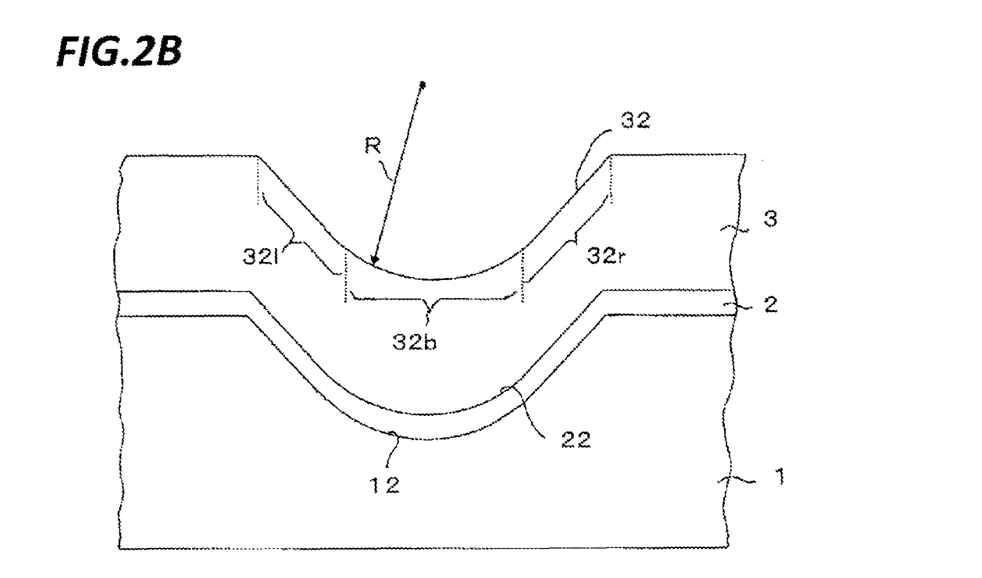

The transparent jig 3 is formed of a light transmissive resin (here, a transparent acrylic resin). FIG. 2B is an enlarged view of a portion corresponding to FIG. 2A. The transparent jig 3 is designed such that the thickness on the rear surface abutted on the front cover is basically uniform, as in the technology disclosed in Japanese Patent Laid-Open Publication No. 2006-12502. Accordingly, an indented area 32 having the same surface shape as that of the indented areas 12 and 22 is formed in an area which corresponds to each of the concaved areas 12 and 22 formed on the opening rim 11 of the lamp body 1 and peripheral edge 21 of the front cover 2. The indented area 32 is configured to include slopes 32r and 32l inclined at the same angle as those of the indented areas 12 and 22 of the lamp body 1 and the front cover 2 and a bottom 32b interposed between the slopes 32r and 32l, and the surface of the bottom 32b is formed as a curved surface having a curvature radius R which is the same as the curvature radius R of each of the indented areas 12 and 22 of the lamp body 1 and the front cover 2.

In the laser welding apparatus 100, when the front cover 2 is welded to the lamp body 1, as illustrated in FIG. 3, the lamp body 1 is supported on the welding table 102, the front cover 2 is disposed on the lamp body 1, and the transparent jig 3 is disposed on the front cover 2. The transparent jig 3 is pressed by the support apparatus so that the transparent jig 3 presses the front cover 2 downwards and the welding surface of the front cover 2 is abutted on the welding surface of the lamp body 1 in a closely contacted state. Then, a laser beam L having a required spot diameter is projected to an area corresponding to the welding surfaces.

The projected spot-like shaped laser beam (hereinafter, referred to as a "spot light") passes through the transparent jig 3 and also passes through the peripheral edge 21 of the front cover 2 positioned under the transparent jig 3 to be projected to the welding surfaces 21a and 11a in which the peripheral edge 21 of the front cover 2 is closely abutted on the opening rim 11 of the lamp body 1. Since the transparent jig 3 and the front cover 2 are formed of a light-transmissive resin but the lamp body 1 is formed of a light-absorptive resin, the lamp body 1 absorbs light to be heated by the projected spot light L, and the front cover 2 is welded by the heat. Since the spot light L is scanned along the welding surface, the front cover 2 is welded to the lamp body 1 over the entire length of the welding surface. In this welding, since the welding is performed through scanning of the spot light L, the welding portions X become linear areas which extend along the closely contacted surfaces with the width Wx corresponding to the spot diameter of the spot light L as illustrated in FIG. 1.

Figure 4A:
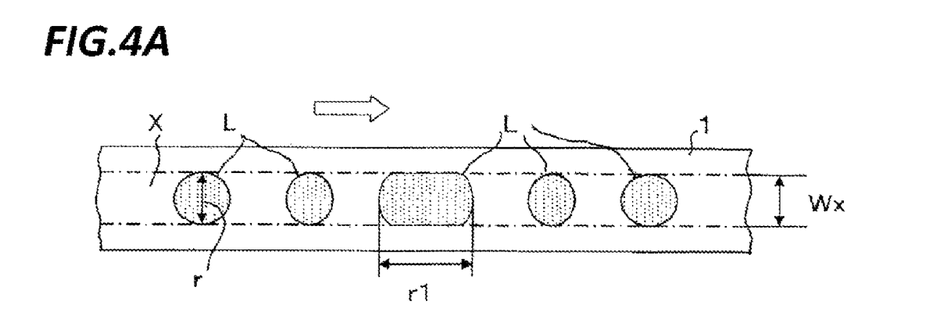
FIGS. 4A and 4B are a plan view and a vertical cross-sectional view which illustrate a spot diameter of a laser beam in an indented area.
Figure 4B:
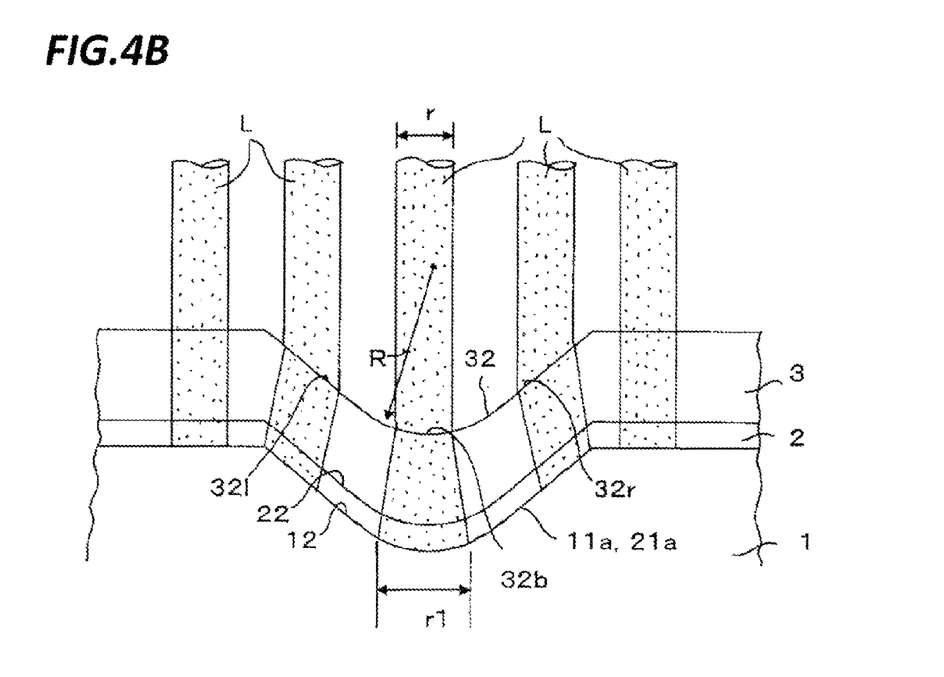

FIGS. 4A and 4B are a plan view and a vertical cross-sectional view for describing a state in which the spot light L is projected to a surface of the transparent jig 3. Since the distance between the laser projecting apparatus 101 and the welding table 102 is sufficiently long as compared to the thicknesses of the transparent jig 3 and the front cover 2, the spot light L projected from the laser projecting apparatus 101 is regarded as being projected substantially in a vertical direction with respect to the surface of the transparent jig 3. Also, the area in the transparent jig 3 basically has a substantially flat shape with a uniform thickness, except for the indented area 32. Therefore, the spot light L, which is projected to the surface of the transparent jig 3 to be incident on the transparent jig 3 and passes through the transparent jig 3 and the front cover 2, is projected to the welding surface substantially without refraction so that the laser welding is performed. At this time, when the spot light L is projected to the surface of the transparent jig 3 and scanned to the surface of the transparent jig 3, an area indicated by chain lines in FIG. 4A becomes the welding portion X. The width Wx in a direction orthogonal to the scanning direction of the welding portion X becomes the width of the welding portion X, and the width Wx becomes equal to the spot diameter r of the spot light L.

Meanwhile, when the spot light L is projected to the indented area 32 of the transparent jig 3, the left and right slopes 32r and 32l of the indented area 32 are inclined with respect to the surface orthogonal to the incident direction of the spot light L. Therefore, for example, in the FIGS. 4A and 4B, when the spot light L is scanned from the left side of the indented area 32 to the right side, the refraction angle becomes smaller than the incident angle because the refractive index of the transparent jig 3 is larger than the refractive index of air. Consequently, the light projected to the left slope 32l of the indented area 32 is refracted to the left side, and the light projected to the right slope 32r is refracted to the right side. Further, when the spot light L is projected to the bottom 32b, the spot light is refracted at the curved surface of the bottom 32b. Therefore, the spot diameter of the spot light L is increased in a direction along the inclination so that the major axis of the spot light becomes r1 (r1>r).

That is, since the bottom 32b has a concavely curved surface, the spot diameter r of the spot light L that has passed through the front cover 2 and the transparent jig 3 is increased in the scanning direction like the refraction of light in a concave lens, and as in FIG. 4A, the spot light L projected to the bottom 32b becomes an elliptical shape having an elongated major axis r1 in the scanning direction on the welding surfaces 11a and 21a. Therefore, a spot area of the spot light L formed in the elliptical shape on the welding surfaces increases as compared to a case where the welding spot has a completely circular shape. When the spot area is increased in this manner, the light energy density decreases so that the welding surfaces may be insufficiently molten. As a result, the welding quality may be degraded or the welding may not be executed.

Figure 5:
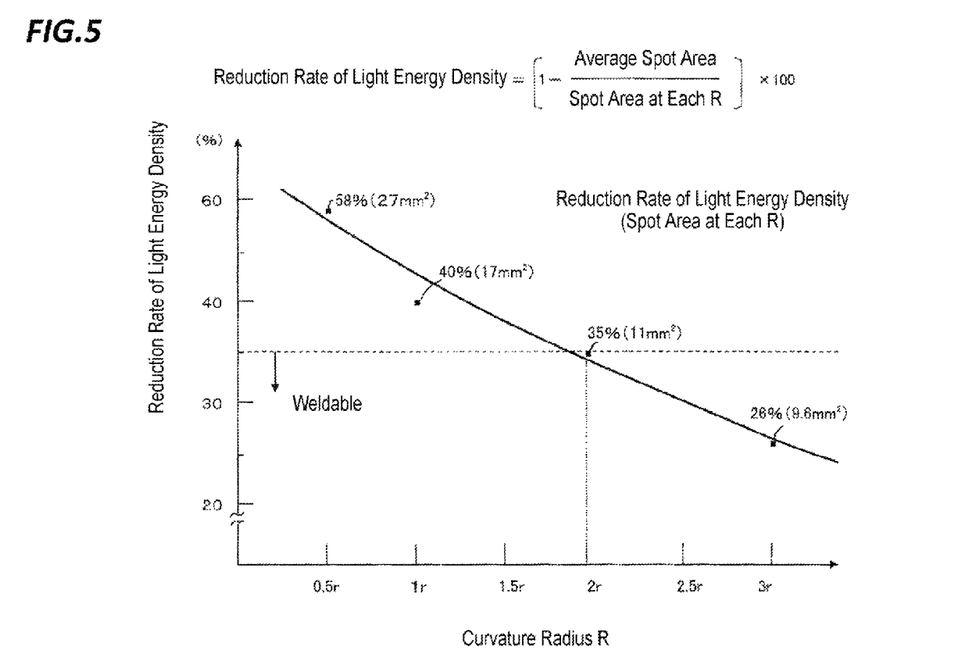
FIG. 5 is a view illustrating a relationship between a curvature radius and a light energy density reduction rate in an indented area.

FIG. 5 is a view representing results of a test performed by the inventors to measure a variation of a spot area on a welding surface when spot lights L were projected to transparent jigs 3 having different surface curvature radiuses R of indented areas 32, in other words, a variation of light energy density. Here, an acrylic resin having a light refraction index of about 1.5 was used for the transparent jig 3 and the front cover 2 illustrated in FIG. 2B, in which the transparent jig 3 had a thickness of 8 mm and the peripheral edge 21 of the front cover 2 had a thickness of 2 mm. In addition, the angles of the left and right slopes 32l and 32r in the indented area 32 with respect to a horizontal direction were set to 50°. Further, a spot light having a spot diameter of 3 mm was projected to the surface of the transparent jig 3 by the laser welding apparatus 100 illustrated in FIG. 3 to be projected to the welding surfaces through the transparent jig 3 and the front cover 2 so as to perform the welding.

In FIG. 5, the horizontal axis represents the curvature radius R of the indented area 32, in which the curvature radius R is several times the spot diameter r of the spot light L. For example, when R=2r, the curvature radius R is two times the spot diameter r. Because the spot diameter is 3 mm, the curvature radius R is 6 mm. As described in the upper portion of FIG. 5, the vertical axis represents a reduction rate of light energy density by an increase of the spot area when the spot light L is projected to the indented area with reference to the spot area of the spot diameter r when the spot light L was projected to a flat surface.

In FIG. 5, among plurality of values measured, the reduction rates of light energy density when the curvature radius R was set to 0.5r, 1r, 2r, and 3r are indicated by dots. In each of the positions indicated by the dots, a reduction rate of light energy density and a specific value of a spot area at that time are indicated. According to FIG. 5, it can be seen that a correlation may be obtained that, when the curvature radius R of the indented area 32 decreases, the reduction rate of light energy density increases, and when the curvature radius R increases, the reduction rate of light energy density decreases.

Meanwhile, according to the test performed by the inventors, it was found that when performing the welding as described above, the welding is possible when the reduction rate of light energy density is in the range of about 30% to 40% and when the reduction rate of light energy density is higher than the range, the welding is insufficient. Therefore, in order to realize highly reliable welding, the curvature radius R is set to make the reduction rate lower than 35%. According to the result in FIG. 5, the point where the reduction rate of light energy density becomes 35% is near the point where the curvature radius R becomes 2r. Therefore, it can be seen that when the curvature radius R is set to be 2r or more, in other words, when the curvature radius R is set to be at least two times the spot diameter r, the reduction rate of light energy density may become 35% or less so that high quality welding may be achieved.

Accordingly, in the present exemplary embodiment, the curvature radius R of the surface of the bottom 32b of the indented area 32 of the transparent jig 3 is formed to be two times the spot diameter r of the spot light L. In other words, as illustrated in FIG. 4A, since the spot diameter r of the spot light L is substantially the same as the width Wx of the welding portion X, it can also be said that the curvature radius R of the bottom 32b of the indented area 32 is formed to be two times the width Wx of the welding portion X.

Referring to the FIG. 4B, since the curvature radius R of the surface of the bottom 32b of the indented area 32 of the transparent jig 3 is formed to be at least two times the spot diameter r of the spot light L, an angle of the surface of the bottom 32b of the indented area 32 of the transparent jig 3, on which the spot light L is incident, with respect to the direction of projecting the laser beam L becomes smaller than an angle of the surfaces of the left and right slopes 32l and 32r with respect to the direction of projecting the laser beam L. Accordingly, the incident angle when the projected spot light L is projected to the bottom 32b becomes smaller and the refraction angle of the spot light L which is refracted to left and right sides becomes smaller so that the spot diameter (size of the major axis) becomes r1.

FIGS. 6A and 6B are a plan view and a vertical cross-sectional view in a case where the bottom 32b of the indented area 32 of the transparent jig 3 is formed in an angular shape or to have a curvature radius R smaller than two times the spot diameter r. In this case, referring to FIG. 6B, the surface of the bottom 32b of the transparent jig 3, on which the spot light L is incident, is substantially the same as the angle of the surfaces of the left and right slopes 32l and 32r. Therefore, the spot light L projected to the bottom 32b is refracted as being refracted at the left and right slopes 32l and 32r. As a result, the spot light L is greatly refracted toward both the left and right sides so that the spot diameter (size of the major axis) of the spot light L becomes r2.

When comparing the spot diameters r1 and r2 of the spot lights L of the FIGS. 4A and 4B and FIGS. 6A and 6B, it is obvious that the spot diameter r1 of FIGS. 4A and 4B, in which the inclination in the surface of the bottom 32b of the indented area 32 of the transparent jig 3 is small, is smaller than the spot diameter r2 of the FIGS. 6A and 6B. As described above, in the case of the spot diameter r1 of the exemplary embodiment illustrated in FIGS. 4A and 4B, the spot area of the spot light is small and thus, the reduction rate of light energy density is 35% or less. Therefore, the welding quality may be improved. Whereas, in the case of the spot diameter r2 of FIGS. 6A and 6B, the spot area is increased and thus, the reduction rate of light energy density becomes higher than the range of 35% to 40%. Therefore, the welding quality may be degraded.

As described above, when the curvature radius R of the bottom 32b of the indented area 32 of the transparent jig 3 is set to be at least two times the spot diameter r of the laser beam L, the increase of the spot diameter of the spot light L refracted at the surface of the transparent jig 3, that is, the increase of the spot area may be suppressed and the reduction rate of light energy density, may be suppressed so that the welding quality may be improved. In other words, when the curvature radius R of the bottom 32b of the indented area 32 is set to be at least two times the width Wx of the welding portion X, the reduction rate of light energy density may be suppressed so that high quality welding may be realized.

In an exemplary embodiment, the transparent jig 3 serving as a holding unit is formed in a uniform thickness. Thus, the curvature radius R of the indented area 32 of the transparent jig 3 becomes equal to the curvature radius of the surface of the indented area 22 of the front cover 2. That is, in the welding structure of the present disclosure, when the first member and the second member are welded to each other using the transparent jig 3 having a uniform thickness, the curvature radius R of the surface of the bottom 22b of the indented area 22 of the front cover 2 may be formed to be at least two times the width Wx of the welding portion X. Accordingly, as compared to the transparent jig 3 having a uniform thickness, the transparent jig 3 having a uniform thickness may promote the uniformity of the welding quality of welding portions.

Further, the transparent jig 3 does not have to have a uniform thickness, and the thickness of the indented area 32 may be formed to be somewhat thicker so long as the welding is not adversely affected. In such a case, when the curvature radius R of the indented area 32 of the transparent jig 3 is formed to be at least two times the spot diameter r, the curvature radius R of the indented area 22 of the front cover 2 does not have to be at least two times the spot diameter r. This is because the spot light L is refracted at the surface of the transparent jig 3, and thus, the refraction at this surface becomes a factor of determining the spot diameter on the welding surfaces, that is, the spot area or the reduction rate of light energy density.

In the exemplary embodiment, the welding has been described in connection with an area which is two-dimensionally recessed along the peripheral edge of the front cover or the opening rim of the lamp body. With respect to an indented area having a three-dimensionally recessed configuration such as a conical recess shape, however, it is also possible to apply the present disclosure to at least a direction where the laser beam is scanned.

The present disclosure is not limited to the welding structure of the lamp housing of the exemplary embodiment so long as a welding structure is configured such that light such as a laser beam is projected to welding surfaces through a transparent jig to weld the welding surfaces to each other and an indented area exists along a light scanning direction for welding. Also, the welding apparatus of the present disclosure is not limited to a welding apparatus to be used when manufacturing a vehicular lamp housing.

The present disclosure may be employed in a welding structure in which welding surfaces are welded to each other by projecting light such as a laser beam through a transparent jig to weld the welding surface to each other, and a welding apparatus for implementing the welding structure.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A welding structure comprising:
    a first member; and
    a light transmissive second member including a surface having an indented area,
    wherein the first and second members are welded to each other at closely contacted surfaces thereof by projecting a spot light from the second member side in a state where the second member is in close contact with the first member, and a curvature radius of the indented area existing on the surface of the second member, to which the spot light is projected, is at least two times a width of a welding portion.

2. The structure of claim 1, wherein the first member is a lamp body of a lamp and the second member is a light-transmissive cover,
    an opening rim of the lamp body and a peripheral edge of the translucent cover are welded to each other, and a indented area is formed in at least a part of the opening rim and the peripheral portion, and
    the welding portion extends along a longitudinal direction of the opening rim and the peripheral portion, and the curvature radius of the indented area is at least two times a width which is orthogonal to the longitudinal direction of the welding portion.

3. A welding apparatus comprising:
    a holding unit configured to hold a first member and a light-transmissive second member in a closely contacted state; and
    a light projecting unit configured to project a spot light from the second member side to closely contacted surfaces of the first and second members by causing the spot light emitted from a light source to pass through the holding unit,
    wherein a curvature radius of an indented area existing on a surface of the holding unit on which the spot light is incident is at least two times a spot diameter of the spot light.

4. The apparatus of claim 3, wherein the holding unit includes a light-transmissive transparent jig which is configured to press the second member against the first member, and the indented area of the transparent jig has a curvature radius which is the same as the curvature radius of the indented area formed in the second member.

* * * * *